United States Patent [19]

Bizard et al.

[11] Patent Number: 5,740,721
[45] Date of Patent: Apr. 21, 1998

[54] ELECTRICAL SAFETY DEVICE FOR FOOD HEATING APPLIANCE

[75] Inventors: Jean-Claude Bizard, Fontaine-les-Dijon; Bernard Beugnot, Is-sur-Tille; Jean-Marie Thevenin, Bourberain, all of France

[73] Assignee: SEB S.A., Ecully, France

[21] Appl. No.: 793,773

[22] PCT Filed: Aug. 22, 1995

[86] PCT No.: PCT/FR95/01103

§ 371 Date: May 15, 1997

§ 102(e) Date: May 15, 1997

[87] PCT Pub. No.: WO96/05761

PCT Pub. Date: Feb. 29, 1996

[30] Foreign Application Priority Data

Aug. 22, 1994 [FR] France ............ 94 10588

[51] Int. Cl.⁶ .................. A47J 37/00; A47J 37/12
[52] U.S. Cl. .................. 99/337; 99/330; 99/336; 99/403; 126/391; 219/492; 219/494; 219/442
[58] Field of Search .................. 99/326–333, 337, 99/338, 336, 403–410, 353–355; 126/391, 369; 219/492, 494, 489, 497, 441, 435–439, 421, 422, 425, 427, 523, 442; 165/163; 210/167, 187, DIG. 8; 426/231, 438

[56] References Cited

U.S. PATENT DOCUMENTS

| 4,217,482 | 8/1980 | Wadia .................. 219/494 |
| 4,282,423 | 8/1981 | Volz .................. 219/442 X |
| 4,372,980 | 2/1983 | Luebke et al. .................. 426/231 |
| 4,636,949 | 1/1987 | Longabaugh .................. 99/332 X |
| 4,668,390 | 5/1987 | Hurley et al. .................. 210/167 |
| 4,785,725 | 11/1988 | Tate et al. .................. 99/330 |
| 4,852,471 | 8/1989 | Lansing .................. 99/336 X |
| 4,913,038 | 4/1990 | Burkett et al. .................. 99/337 X |
| 5,186,097 | 2/1993 | Vaseloff et al. .................. 99/403 X |
| 5,367,949 | 11/1994 | Nitschke et al. .................. 99/407 X |
| 5,586,486 | 12/1996 | Nitschke et al. .................. 99/336 X |
| 5,601,011 | 2/1997 | Minari et al. .................. 99/337 |
| 5,605,091 | 2/1997 | Garber .................. 99/330 |

FOREIGN PATENT DOCUMENTS

| 0 546 208 A1 | 6/1993 | European Pat. Off. . |
| 598 794 | 5/1978 | France . |
| 36 19 762 A1 | 12/1987 | Germany . |
| 40 12 075 A1 | 10/1991 | Germany . |
| 1281329 | 11/1989 | Japan . |

*Primary Examiner*—Timothy F. Simone
*Attorney, Agent, or Firm*—Loeb & Loeb LLP

[57] ABSTRACT

The field of the invention concerns heating or cooking appliances. The cooking appliance comprises a casing (2) enclosing an integrated fixed or removable cooking receptacle (1) and heating means thermally connected to the cooking receptacle (1), means (3) for detecting, firstly, whether the cooking receptacle (1) is substantially empty and, in this case, opening the electrical supply circuit of the heating means, and secondly, for detecting whether the cooking receptacle (1) is filled so as to attain the predefined minimum weight, and, in this case, closing the electrical supply circuit of the heating means. According to the invention, the detection means (30) are operable by placing the cooking receptacle (1) in the casing, and by closing the lid (3).

12 Claims, 6 Drawing Sheets

ELECTRICAL SAFETY DEVICE FOR FOOD HEATING APPLIANCE

TECHNICAL FIELD

The present invention relates to the general technical field of heating or cooking appliances intended for deep frying in an oil bath in particular.

The present invention concerns a heating appliance for foodstuffs, in particular for deep frying in oil, comprising a cooking receptacle mounted for example in a removable manner in a casing, as well as heating means disposed under the cooking receptacle, which are associated with temperature regulating means and means for detecting the presence and the filling of the cooking receptacle.

The present invention concerns more particularly but not exclusively an electric fryer intended for the cooking of foodstuffs such as french fries, meat or fish, and comprising means for detecting the presence and/or the filling of the cooking receptacle.

PRIOR ART

Means for detection of presence and/or of filling according to a minimum threshold of a cooking receptacle of a cooking container such as a fryer are already known. Most often, such means permit control of the heating means in a fashion such that the latter cannot be activated in certain predetermined cases. For example, it is desired to avoid activating the heating element when the cooking receptacle is withdrawn or when it is insufficiently filled. In these two cases, it is a question of assuring the safety of the user and avoiding all damage which might be caused to the appliance. In order to achieve this control, devices of known types utilize for example activating means associated with a spring, aligned with a switch. The presence of the cooking receptacle and/or its weight lead to a displacement of the activating means. The switch is thus activated.

The document CH 598 794 describes such means, in this case disposed on the support of the cooking receptacle. The device moreover does not comprise a cover and the heating means are provided in the oil bath.

The document DE-A-40 12 075 describes an electric fryer comprising a removable cooking receptacle heated by at least one heating element disposed under this latter. Cooking proceeds in a closed enclosure due to the presence of a cover. The fryer comprises moreover monitoring means cooperating with the cooking receptacle.

However, such devices contain certain limitations which make their utilization on certain types of cooking appliances impossible if one wishes to provide an appliance offering an optimum guarantee of safety to the user.

In addition, in the case where the fryer has a sealing gasket at the interface of the cover and of the casing, as well as means permitting said gasket to be compressed between the cover and the cooking receptacle during closing in order to obtain a sealed cooking enclosure at the level of the peripheral edge of the cooking receptacle, a closing of the cover with compression of the gasket would be susceptable to producing the activation of the activating means. Thus, in the case where such an element will be utilized as the sole activating means of the switch, as is the case with devices of the known type, situations are known in which the electric supply circuit will be closed upon closing of the cover, and this despite the absence of the cooking receptacle or even with a cooking receptacle which is empty or insufficiently filled. Such a dangerous situation can be avoided by the present invention.

SUMMARY OF THE INVENTION

According to the invention, there is thus provided a second activating means which has for its effect that an activation of the first means by accident or due to a compression of the sealing gasket of the cover, which, during its closing bears against the first means, remains without effect upon activation of the switch. In effect, in such a case, closing of the cover leads to a displacement of the second activating element, activated for example by a raised portion or a pin provided on the cover. This second element then inhibits the action of the first activating element and the electrical supply circuit remains open, thus avoiding initiation of heating when the cooking receptacle has been withdrawn for cleaning, or even when the latter is not sufficiently filled.

Moreover, the device according to the present invention is compact, economical, simple and very reliable, which is imperative when one takes into account the role of the device with respect to the user's safety.

The object assigned to the invention aims to produce a heating appliance for which the electric supply is automatically cut when the cooking receptacle is not sufficiently filled, in a manner to avoid a functioning when the appliance is empty.

The object assigned to the invention also aims at providing a heating appliance comprising a removable cooking receptacle and of which the electrical supply is automatically cut when the cooking receptacle is not present in the appliance casing.

Another object of the invention aims to furnish a heating appliance presenting great operating safety, notably with regard to overheating due to heating when empty or any risk connected with the absence or a small quantity of cooking or frying medium. The operating safety should equally be comprised as safety with respect to negligent utilization of an appliance according to the invention, consisting for example in utilizing a cooking receptacle other than the original cooking receptacle in the casing.

A supplemental object of the invention aims to provide in a simple and inexpensive manner a heating appliance assuring great operating security.

The objects assigned to the invention are achieved with the aid of a cooking appliance comprising a casing in which are integrated a cooking receptacle, intended for the cooking of foodstuffs, heating means in thermal communication with the cooking receptacle, detection means arranged on the one hand, to detect if the cooking receptacle is substantially empty and in this case to open the electric supply circuit of the heating means, and on the other hand to detect if the cooking receptacle is filled in a manner to achieve a preestablished minimum weight, in order in this case to close the electric supply circuit of the heating means, characterized in that the cooking receptacle is removable and in that the detection means comprise a first activating element activated by the cooking receptacle when this latter is in place in the casing, and a second activating element activated by the cover of the appliance when the cover is closed on the cooking receptacle, said second activating element being capable of acting in a manner to inhibit the action of the first activating element when the cooking receptacle is not in place in the casing or when the cooking receptacle has not achieved the predetermined minimum weight.

BRIEF DESCRIPTION OF THE DRAWINGS

Other objects and advantages of the invention will appear in greater detail from reading of the description which follows, with reference to the attached drawings, given by way of illustrative and nonlimitative examples in which.

BEST MANNER OF CARRYING OUT THE INVENTION

Figure 1:
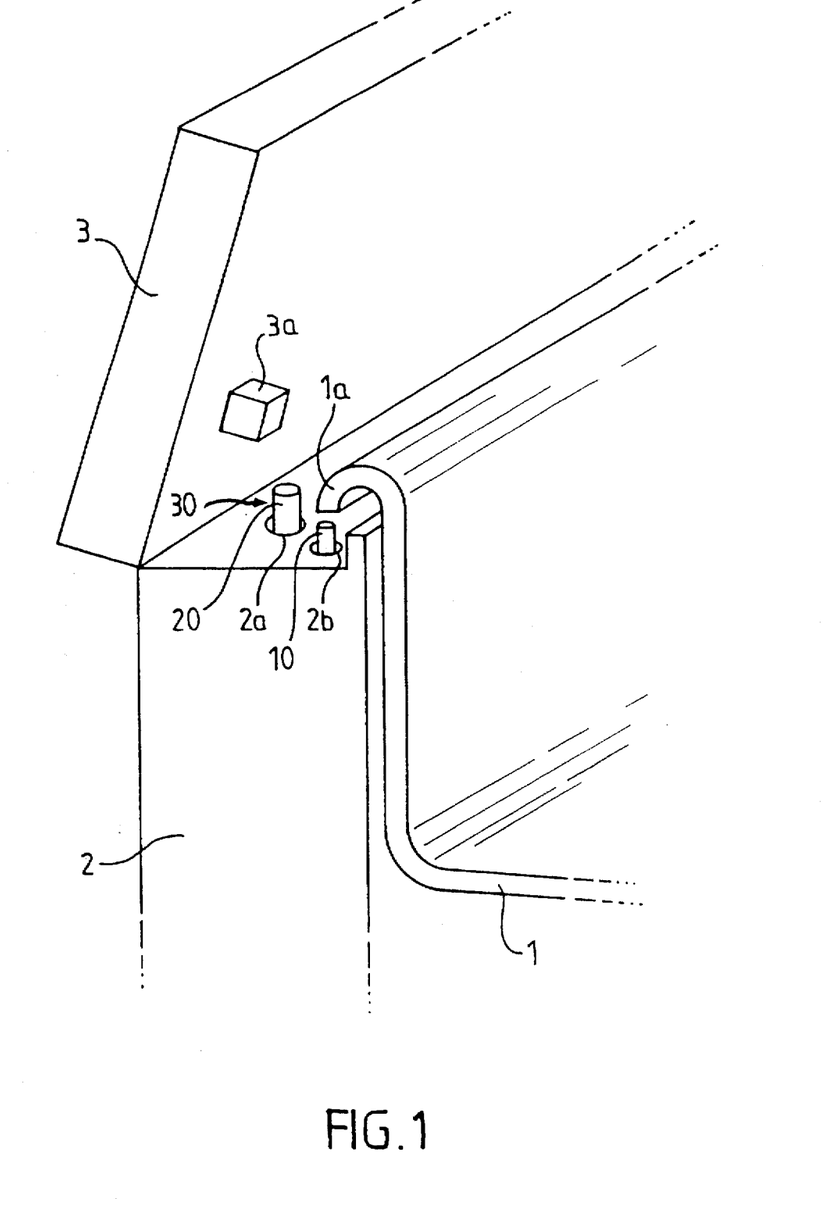
FIG. 1 represents a partial view in perspective of an example of mounting of detection means in an appliance according to the invention.

FIG. 1 represents a partial and perspective view of an example of arrangement of detection means 30 in a fryer, this latter comprising a cooking receptacle 1 arranged in a casing 2.

Cooking receptacle 1 presents a rolled peripheral edge 1a in its upper part permitting it to act on detection means 30.

Cooking receptacle 1, intended to receive foodstuffs for cooking, or cooking or frying medium, thus, presents the rolled peripheral edge 1a permitting it to rest at least in part on casing 2.

The fryer also comprises heating means in thermal communication with cooking receptacle 1 at least when said fryer is in operation.

Figure 2A:
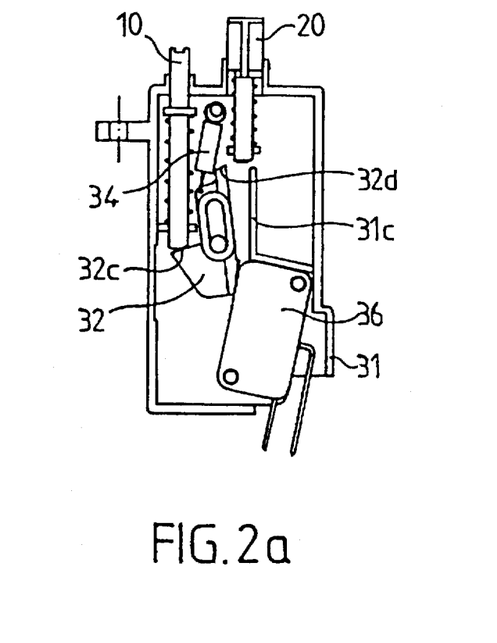
FIGS. 2a to 2d represent different positions of the detection means of the appliance according to the invention.
Figure 2B:
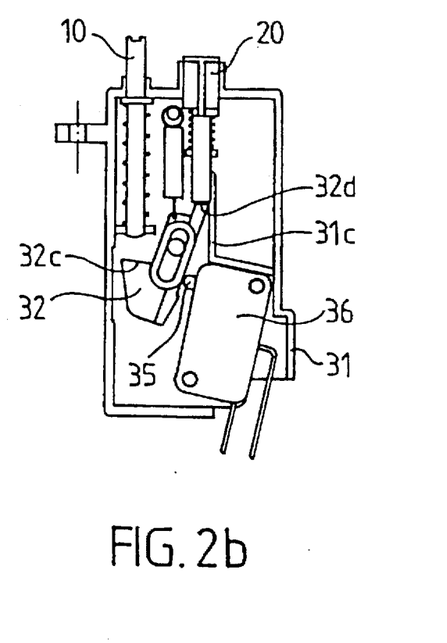
Figure 2C:
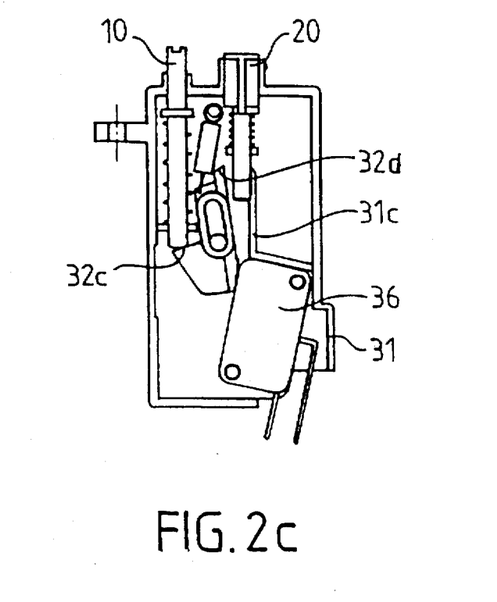
Figure 2D:
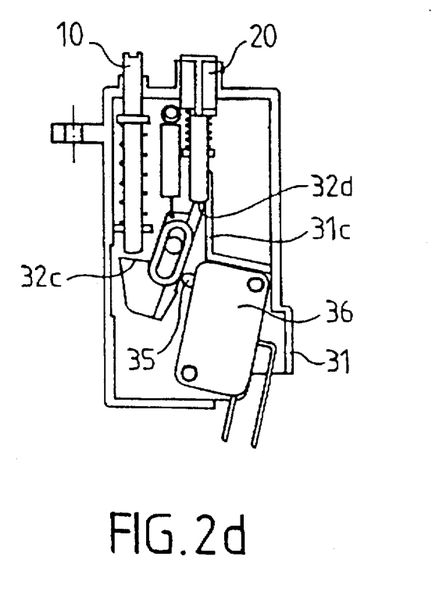
Figure 2E:
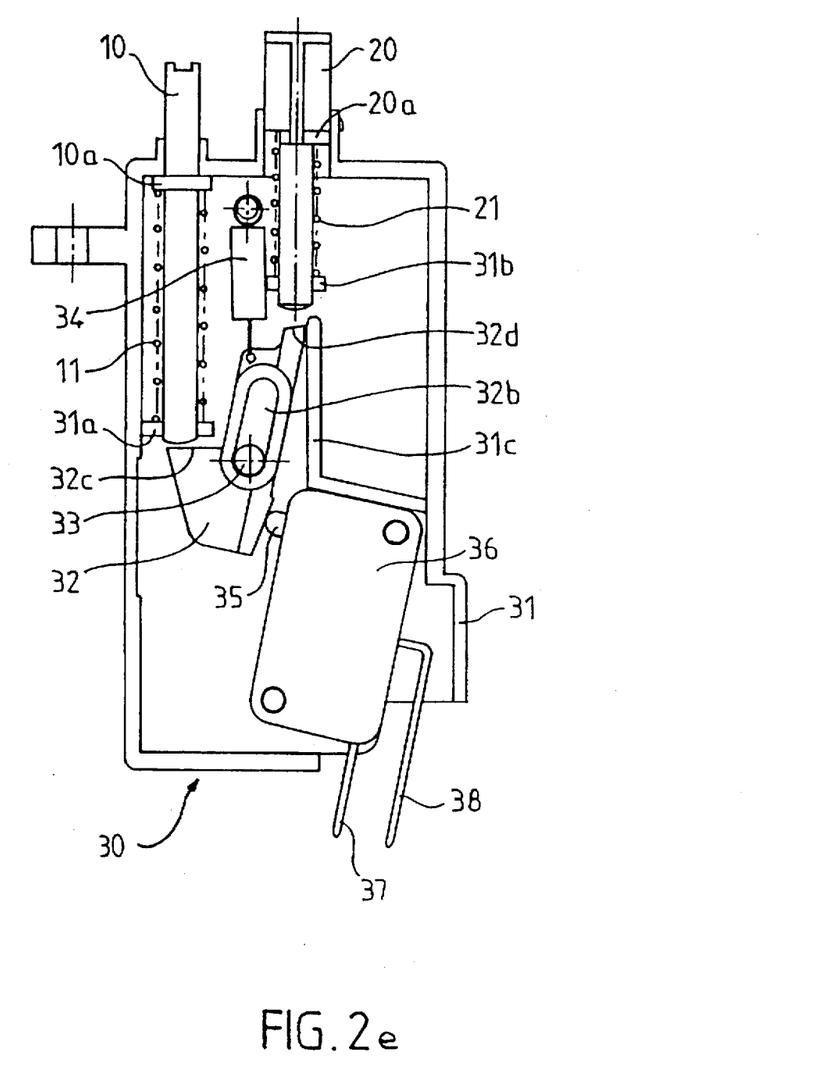
FIG. 2e represents a cross-sectional view of detection means arranged in the appliance according to the invention.

The detecting means 30, represented particularly in FIG. 2e, are arranged to close or open the electric supply circuit of the heating means when removable cooking receptacle 1 is respectively present or absent in casing 2. The detecting means 30 are equally arranged, when the removable cooking receptacle 1 is present, on the one hand to detect if removable cooking receptacle 1 is empty; in such a case, the electric supply circuit is open, or on the other hand to detect if removable cooking receptacle 1 is filled in a manner to attain a preestablished minimum weight; in such a case, the electric supply circuit of the heating means is closed.

Advantageously, detecting means 30 are arranged in a housing 31 comprising two substantially parallel main faces, between which are found the elements constituting means 30. Housing 31 is moreover arranged in casing 2. Detecting means 30 comprise at least one activation means or transmission element 10 activated by cooking receptacle 1 when this latter is in place in casing 2, a rocker switch 32 moveable between a return position in contact with transmission element 10 and at least one working position in which said rocker switch 32, activated by transmission element 10, bears on a button 35 of a switch 36 of the electric supply circuit of the heating means.

Switch 36 presents electric connections 37, 38 passing out of housing 31 to be connected to the electric supply circuit of the heating means.

Advantageously, detecting means 30 comprise a second activating or transmission element 20 activated by a cover 3 of the appliance when cover 3 is closed on cooking receptacle 1. The second transmission element 20 acts equally on the rocker switch 32 in order to inhibit the action of the first transmission element 10 when cooking receptacle 1 is not in place in casing 2, or when cooking receptacle 1 has not achieved the predetermined minimum weight.

Advantageously, the activating elements 10, 20 are constituted by rigid shanks projecting out of housing 31 by one of their extremities. These activating elements 10, 20 are movable in translation and are guided by guide means 31a, 31b which can be constituted for example by shanks disposed on one side and the other of the translation axis 33 of elements 10 and 20 in a fashion such that the latter can slide freely. In the embodiment example illustrated, these means form part of the housing 31. The activating elements 10, 20 are displaced between a working position acting on the rocker switch 32 and a rest position with an edge 10a, 20a bearing against the internal part of housing 31. In this second position, rocker switch 32 is not activated. In the absence of an action or of a force exerted on the extremity of the activating elements 10, 20, projecting out of housing 31, said activating elements 10, 20 are maintained in their rest position by the intermediary of elastic restoring means 11, 21 such as for example compression springs. These latters are wedged for example between guide means 31a, 31b and edges 10a, 20a of transmission elements 10, 20 permitting blocking of said transmission elements 10, 20 against housing 31 in their rest position.

Rocker switch 32, represented in FIG. 2e, is a mechanical part, presenting on the one hand a guide groove 32b, traversed by a fixed axis 33 and, on the other hand, by two bearing arms 32d, 32c distributed around axis 33 to come opposite transmission elements 20, 10, respectively, in a manner to be activated by the transmission elements 20, 10, respectively. Axis 33, perpendicular to the axes of elements 10 and 20 is advantageously provided in the extension of these axes, between them, in a manner to connect together the two principal faces of housing 31. The axis 33 is thus advantageously fixed to the housing 31 and permits rocker switch 32 to move either in translation in the direction of guide groove 32b, or in rotation around axis 33, or by a combination of these two movements. In addition, rocker switch 32 is maintained in its return position by the intermediary of a restoring element 34, for example a tension spring, when none of the transmission elements 10, 20 is activated. The return position of rocker switch 32 corresponds substantially to the rest positions of transmission elements 10, 20.

The restoring element 34 is advantageously fixed on rocker switch 32, for example at an external end of groove 32b, on the housing 31, for example, near the wall of the housing 31, between elements 10 and 20, by any known means.

Translation movement of the rocker switch 32 is at the same time guided by guide groove 32b and by a means such as a rib 31c, fixed to one of the faces of housing 31, and oriented in a manner substantially parallel to the axis 33 of transmission element 20. Rib 31c particularly permits rocker switch 32 and more precisely support arm 32d to be aligned substantially along the displacement axis 33 of element 20, in immediate proximity or even in contact with the latter, while the first transmission element 10 does not act on rocker switch 32. In return, rocker switch 32 is driven with a rotation movement around axis 33 in order to bear on button 35 controlling the opening and the closing of the supply circuit of the heating means when the first transmission element 10 is activated. It is only the rocking or the pivoting of rocker switch 32 which permits pressing on button 35. Thus, when the second transmission element 20 is activated, i.e. when it bears on support arm 32d of rocker switch 32, this latter is displaced in translation, and in particular support arm 32c is displaced toward the bottom, by a distance sufficient to prevent any contact of support arm 32c with the first transmission element 10, thus preventing a pivoting of rocker switch 32 when said first transmission element 10 is activated after the second transmission element 20 (FIG. 2d).

In addition, when the first transmission element 10 is activated, in a manner to pivot rocker switch 32, support arm 32d pivots into a position such that said support arm 32d is no longer opposite the second transmission element 20 (FIGS. 2a and 2c). Such a situation corresponds to starting of the heating means by the intermediary of button 35 and of switch 36 which are activated by rocker switch 32 independently of the position of the second transmission element 20 and consequently of cover 3. The appliance according to the invention is thus capable of being utilized with cover 3 closed or open for open air cooking. Such cooking obviously assumes that the first transmission element 10 is activated which corresponds to the presence of cooking receptacle 1 in casing 2 when this latter is removable and/or sufficient filling of said cooking receptacle 1 to present a predetermined minimum weight. This predetermined minimum weight is obtained easily with the aid of elastic restoring means 11, for example a spring, presenting a well defined constant stiffness and consequently a predetermined tare selection of such an elastic restoring means 11 allows a displacement by translation of the first transmission element 20 sufficient to cause pivoting of rocker switch 32 when cooking receptacle 1 is present in casing 2 and when it is sufficiently filled, preferably by a given minimum quantity of product to be fried. Thus, the tare of elastic restoring means 11 corresponds for example to the minimal quantity of oil present in cooking receptacle 1. The weight of filled cooking receptacle 1 thus permits activation of button 35. Such a conception permits avoiding operation when empty of the appliance according to the invention and particularly of a fryer. In a preferred manner, detecting means 30 are at least partially housed in housing 31, fixed to casing 2 in a manner to present the ends of transmission elements 10, 20 which extend out of housing 31 in order to come in contact with respectively cooking receptacle 1 and cover 3. Moreover, cooking receptacle 1 presents the rolled peripheral edge 1a in its upper part in order to permit said cooking receptacle 1 to rest on casing 2 and at least partially on the first transmission element 10.

Advantageously, cover 3 presents a supplemental raised portion 3a fixed to cover 3 in order to come to bear on the second transmission element 20 when cover 3 is closed on cooking receptacle 1.

Advantageously, the second transmission element 20 presents a travel path sufficient to displace rocker switch 32 in the direction of guide groove 32b in order to avoid all contact between support arm 32c and the first transmission element 10 when cooking receptacle 1 is empty or when cooking receptacle 1 is absent from casing 2 (FIGS. 2b and 2d).

Such a design is particularly desirable to the extent that appliances of the fryer type present in general at least one sealing gasket 60 the interface of cover 3 and casing 2, as well as means permitting compression of said gasket between cover 3 and cooking receptacle 1 at the time of closing in order to obtain a cooking enclosure which is sealed at the level of the rolled peripheral edge 1 a of cooking receptacle 1. Closing of cover 3 with compression of said gasket will be succeptable to displacing the first transmission element 10.

Thus, in the case where such an element will be utilized as the sole means for activating the switch 36, as is the case with devices of known type, one will know situations where the electric supply circuit will be closed upon closing of the cover 3, and this despite the absence of a cooking receptacle or even with a cooking receptacle which is empty or insufficiently filled. Such a dangerous situation can be avoided by the present invention.

Figure 5:
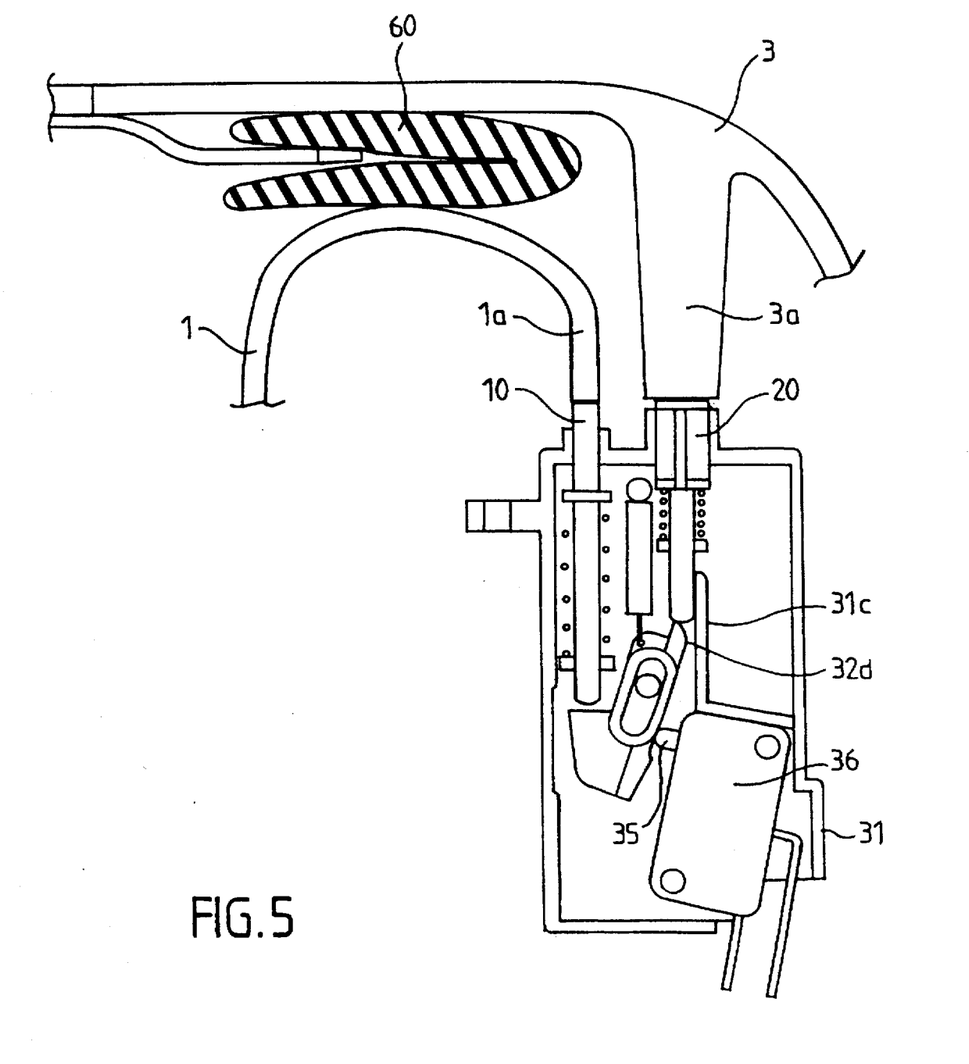
FIG. 5 represents a cross-sectional view of an example of construction of detection means in an appliance according to the invention when the cover is closed.

According to the invention, there is thus provided a second activating element 20, which has for its effect that an activation of the first means 10 by an accidental cause or due to compression of sealing gasket 60 of the cover 3, which, during its closing bears against the first means 10, remains without effect on the activation of the switch 36. In effect, in such a case, closing of the cover 3 leads to displacement of the second activating element, activated for example by a raised portion 3a or a pin provided on the cover 3. This second element then inhibits the action of the first activating element and the electric supply circuit remains open, thus avoiding triggering heating when the cooking receptacle has been withdrawn for cleaning, or even when the latter is not sufficiently filled (FIG. 5).

In effect, displacement of transmission element 10 is without effect on rocker switch 32 when the latter is found in its lowered position, i.e. its working position, which is obtained by displacement of the second transmission element 20 bearing on rocker switch 32, said second transmission element 20 being activated by raised portion 3a. Such a situation is represented in FIG. 2d. Any electric supply of the heating means is thus impossible if cooking receptacle 1 has not attained its predetermined weight.

According to another embodiment of the appliance according to the invention, cover 3 is removable in a manner to provide an appliance for uncovered cooking. The appliance is constituted for example by a fryer.

According to another embodiment of the appliance according to the invention, cooking receptacle 1 is fixed to casing 2 in presenting however a mobility with respect to casing 2 sufficient to activate the first transmission element 10.

The casing 2 presents in addition openings 2a and 2b which are traversed respectively by the extremities of transmission elements 20, 10.

Figure 3:
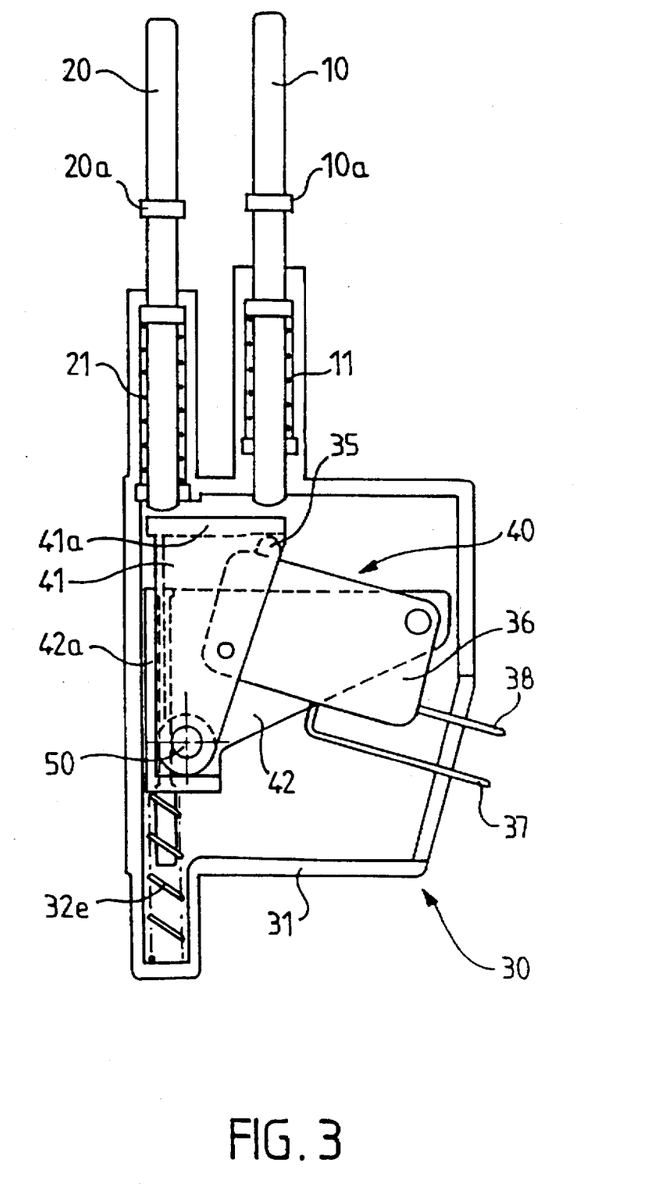
FIG. 3 represents another embodiment of detection means of the appliance according to the invention.

According to another embodiment of the appliance according to the invention shown in FIG. 3, detecting means 30 comprise a switching mechanism 40 composed of at least three distinct pieces movable with respect to one another. The switching mechanism 40 is constituted by a support element 41 coming opposite transmission elements 10, 20, by a carriage 42 supporting support element 41 and moveable in translation in the direction of displacement of transmission elements 10, 20 as well as switch 36 mounted on carriage 42. The support element 41 also presents in its upper part a support edge 41a coming in contact with button 35 of switch 36.

The support element 41 is mounted in rotation on carriage 42. Thus, a pivoting or a rocking of support element 41 permits activating button 35. The support element 41 is capable of pivoting with respect to the carriage 42 by the intermediary of a pivot axis 50 disposed substantially in the extension of the second transmission element 20 in a manner to prevent any pivoting of support element 41 when the second transmission element 20 exerts a force on said support element 41. To this effect, there can be provided a lateral edge 42a on carriage 42 in a manner to constitute an abutment for support element 41. The bearing zone of the second transmission element 20 can then be offset further with respect to pivot axis 50, in a manner such that support element 41 undergoes a rocking force applied on support element 41. The rotation of this latter is impeded by the lateral edge 42a. Thus, when the second transmission element 20 is activated, it exerts a pressure on support element 41 which itself drives carriage 42 downwardly while compressing a compression spring 32e. The small offsetting of the direction of displacement of the second transmission element 20 with respect to the pivot axis 50, as well as the presence of a lateral edge 42a serving as an abutment on carriage 42 prevents any pivoting of support element 41 when the second transmission element 20 is activated. The assembly constituting switching mechanism 40 is thus displaced downwardly without exerting a pressure on button 35 of switch 36. Such a situation corresponds for example to the closing of cover 3 of the fryer according to the invention in the absence of a cooking receptacle 1 in casing 2 or in the presence of a cooking receptacle 1 which is empty or insufficiently filled. In return, when the first transmission element 10 is activated, this exerts a force on support element 41 in a zone shifted with respect to pivot axis 50 and situated at the opposite side of lateral edge 42a. The pressure exerted on support element 41 thus provokes its pivoting as well as the activation of button 35 of switch 36. The support element 41 is thus not found in abutment against the lateral edge 42a. Pivoting of support element 41 also permits disengagement of the trajectory of the second transmission element 20 and consequently closing of cover 3 of the fryer without interrupting the electric connection obtained by the activation of button 35.

Advantageously, the tare of elastic restoring means 11 is effectuated in a manner to prevent activating of button 35 when only cooking receptacle 1 bears on the first transmission element 10 by the intermediary of its empty weight. When empty cooking receptacle 1 is placed in casing 2 and when the user closes cover 3 on cooking receptacle 1, displacement of the second transmission element 20, and consequently switching means 40, prevents any activation of button 35 and thus operation of the heating means.

The dimensions and the maximum and minimum travels of transmission elements 10 and 20, as well as the dimensions of switching mechanism 40 or of rocker switch 32 are easily determinable by experimentation.

The operation of the detection means according to the invention is the following.

When the user closes cover 3 on casing 2 of the fryer in the absence of cooking receptacle 1, (FIG. 2b), the heating means are not capable of being electrically supplied.

This is obtained by the intermediary of the second transmission element 20.

When the user positions cooking receptacle 1 in the casing 2, and when said cooking receptacle 1 is empty, or contains a weight inferior to a predetermined minimal value, (FIG. 2d), displacement of the first transmission element 10 is not sufficient to activate button 35 of switch 36. The heating means are thus not supplied electrically, independently of the opening or the closing of cover 3. When the user fills cooking receptacle 1 with cooking oil or foodstuffs, in a manner such that said cooking receptacle 1 presents a weight greater than the predetermined value, the first transmission element 10 exerts a pressure on button 35 which thus permits the heating means to be supplied electrically, and this independently of the opening or the closing of cover 3 (FIGS. 2a and 2c).

The detection means according to the present invention are particularly adapted, but not exclusively, to be utilized in fryers comprising on the one hand a removable cooking receptacle 1 and on the other hand an outer receptacle enveloping removable cooking receptacle 1 and heating means arranged in the bottom of the outer receptacle.

Thus, FIG. 2a corresponds to a fryer comprising a full cooking receptacle 1 with its cover 3 open, while FIG. 2c corresponds to the case where cover 3 is closed on cooking receptacle 1 of the same fryer.

FIG. 2b corresponds to the case where cover 3 is closed on casing 2 in the absence of cooking receptacle 1, and FIG. 2d corresponds to the case where cover 3 is found closed on casing 2, furnished with its cooking receptacle 1 which is empty or insufficiently filled.

Figure 4:
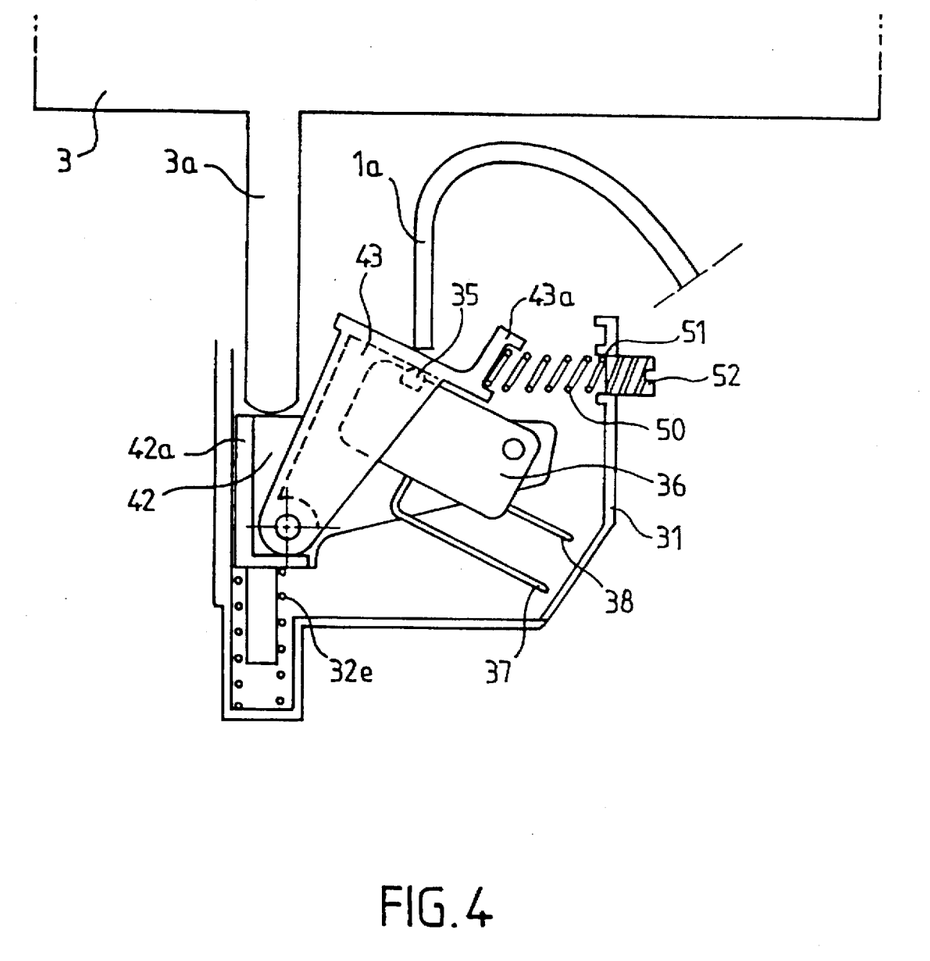
FIG. 4 represents a cross-sectional view of another embodiment of the detection means of the appliance according to the invention.

According to another embodiment of the appliance according to the invention, represented for example in FIG. 4, detecting means 30 comprised a carriage 42 associated with a restoring spring 32e, said carriage 42 being on the one hand displaced at least in translation by cover 3 of the appliance from the time that said cover 3 bears on carriage 42 in order to prevent a contact means from supplying the heating means when cooking receptacle 1 is absent or when cooking receptacle 1 has achieved a weight below the preestablished minimum weight.

The contact means comprises a support piece 42 movably mounted in rotation on carriage 42 and activated by the rolled peripheral edge 1a when said cooking receptacle 1 is present in casing 2 and has attained the preestablished minimum weight.

Thus, when cooking receptacle 1 is absent or has not attained the preestablished minimum weight to cause rocking of the support piece 43, the raised portion 3a bears on the support piece 43 in a manner to displace carriage 42 by translation, thus preventing any activation of button 35. A possible compression of cover 3 on cooking receptacle 1 at the time of closing is not further able to activate button 35 when carriage 42 is displaced toward the bottom.

In addition, support piece 43 is associated with a tare spring fixed on a wall 43a of support piece 43, and on housing 31 containing detecting means 30, in a manner to bring support piece 43 into a position opening switch 36 of the supply circuit of the heating means when cooking receptacle 1 is either absent or is present in the casing 2 with a weight inferior to the preestablished minimum weight.

Advantageously, the tare spring 50 is mounted on housing 31, by the intermediary of an orifice 51 arranged in said housing 31 and of a regulating means 52 for the tension of the tare spring 50.

According to other embodiments of the appliance according to the invention, not shown in the Figures, the detecting means 30 are constituted for example by a ball switch permitting to establish or break electric contact when it is not in the vertical position.

Such a switch can, in a known manner, be mounted in housing 31.

Detecting means 30 can equally be constituted by optical or magnetic means permitting determination of the position of cooking receptacle 1 in casing 2 and consequently to determine its degree of filling. Advantageously, these detecting means 30 can be associated with a microprocessor intended to control the heating means.

An advantage of an appliance comprising detection means according to the invention resides in the utilization of simple mechanical means when the cooking receptacle 1 is removable or fixed.

Another advantage of the appliance according to the invention results from the detection means which constitute operating safety means for said appliance.

POSSIBILITIES OF INDUSTRIAL APPLICATION

The invention finds its industrial application in the fabrication of appliances for cooking foods by immersion in a bath of oil, and in particular in the fabrication of electric fryers.

We claim:

1. Cooking appliance comprising a casing (2) in which are integrated a cooking receptacle (1) intended for the cooking of foodstuffs, heating means in thermal communication with the cooking receptacle (1), detecting means (30) arranged on the one hand to detect if the cooking receptacle (1) is substantially empty and in this case to open the electric supply circuit of the heating means, and on the other hand to detect if the cooking receptacle (1) is filled in a manner to achieve a preestablished minimum weight, in order in this case to close the electric supply circuit of the heating means, characterized in the cooking receptacle (1) is removable and in that the detecting means (30) comprise a first activating element (10; 43) activated by the cooking receptacle (1) when this latter is in place in the casing (2), and a second activating element (20; 42) activated by the cover (3) of the appliance when the cover (3) is closed on the cooking receptacle (1), said second activating element (20; 42) being capable of acting in a manner to inhibit the action of the first activating element (10; 43) when the cooking receptacle (1) is not in place in the casing (2) or when the cooking receptacle (1) has not achieved the predetermined minimum weight.

2. Appliance according to claim 1, in which the detection means (30) comprise a rocker switch (32) movable between a restoring position in contact with the transmission element (10) and at least one working position in which said rocker switch (32) activated by the activating element (10) bears on a button (35) of a switch (36) of the electric feed circuit of the heating means.

3. Appliance according to claim 2, in which the rocker switch (32) is a mechanical piece presenting on the one hand a guide groove (32b) traversed by a fixed axis (33) and on the other hand two support arms (32d, 32c) distributed around the axis (33) in order to come opposite respectively the activating elements (20, 10) in manner to be activated by the activating elements (20, 10).

4. Appliance according to claim 3, in which the rocker switch (32) is driven with a translation movement by the guide groove (32b) when the second activating element (20) is activated, the rocker switch (32) being driven with a rotational movement around the axis (33) in order to bear on the button (35) which controls the opening and the closing of the electric supply circuit of the heating means, when the first activating element (10) is activated.

5. Appliance according to claim 2, in which the rocker switch (32) is maintained in its return position by the intermediary of a restoring element (34) when none of the activating elements (10, 20) is activated.

6. Appliance according to claim 1, in which the detection means (30) are at least partially housed in a housing (31) fixed to the casing (2) in a manner to present extremities of the activating elements (10, 20) extending out of the housing (31) in order to come into contact with respectively the cooking receptacle (1) and the cover (3).

7. Appliance according to claim 1, in which the detection means (30) comprise a carriage (42) associated with a restoring spring (32e), said carriage (42) being on the one hand displaced at least in translation by the cover (3) of the appliance when said cover (3) bears on the carriage (42) in order to prevent a contact means from supplying the heating means when the cooking receptacle (1) is absent or when the cooking receptacle (1) has attained a weight less than the preestablished minimum weight.

8. Appliance according to claim 7 characterized in that the contact means comprises a support piece (43) movably mounted in rotation on the carriage (42) and activated by the cooking receptacle (1) when said cooking receptacle (1) is present in the casing (2) and has attained the preestablished minimum weight.

9. Appliance according to claim 8 characterized in that the support piece (43) is associated with a tare spring (50) fixed on a wall (43a) of the support element (41), and on the housing (31) containing the detection means (30), in a manner to bring the support piece (43) into a position opening the switch (36) of the supply circuit of the heating means when the cooking receptacle (1) is either absent, or is present in the casing with a weight inferior to the preestablished minimum weight.

10. Appliance according to claim 1 characterized in that the cooking receptacle (1) presents a rolled peripheral edge (1a) in its upper part permitting it to act on the detection means (30).

11. Appliance according to claim 2 characterized in that the cover (3) is removable in a manner to provide an appliance for uncovered cooking.

12. Appliance according to claim 1 characterized in that it is constituted by a fryer.

* * * * *